United States Patent [19]

Lavallee

[11] 4,330,195

[45] May 18, 1982

[54] MULTIPLE MODE IMAGE PROCESSING APPARATUS AND METHOD

[75] Inventor: Pierre A. Lavallee, Penfield, N.Y.

[73] Assignee: Xerox Corporation, Stamford, Conn.

[21] Appl. No.: 122,560

[22] Filed: Feb. 19, 1980

[51] Int. Cl.³ .......................................... G03G 15/00
[52] U.S. Cl. ................... 355/3 R; 346/153.1; 346/160; 355/77; 355/133
[58] Field of Search ................... 355/1, 3R, 8, 16, 77, 355/133; 346/153.1, 155, 160

[56] References Cited

U.S. PATENT DOCUMENTS

| | | | |
|---|---|---|---|
| 2,927,834 | 3/1960 | Solar | 346/21 |
| 3,552,221 | 1/1971 | Tates | 74/142 |
| 3,659,936 | 5/1972 | Klose et al. | 355/3 R |
| 3,681,527 | 8/1972 | Nishiyama et al. | 355/3 R X |
| 3,751,582 | 8/1973 | Wernikoff et al. | 178/6 |
| 3,824,008 | 7/1974 | Smith | 353/26 |
| 4,013,360 | 3/1977 | Burke et al. | 355/27 |
| 4,027,961 | 6/1977 | Starkweather | 355/3 R |
| 4,042,962 | 8/1977 | Yamaji et al. | 355/11 X |
| 4,134,668 | 1/1979 | Coburn | 355/3 R |
| 4,268,159 | 5/1981 | Tashiro | 355/3 R |

FOREIGN PATENT DOCUMENTS 54-53915 4/1979 Japan .
1374085 11/1974 United Kingdom .

Primary Examiner—Fred L. Braun
Attorney, Agent, or Firm—Frederick E. McMullen

[57] ABSTRACT

A multiple mode image processing apparatus and method. The apparatus, in a copy mode, processes copies xerographically. In a write mode, images derived from image signals are written on the apparatus photoreceptor by a raster scanner, and in a read mode, the raster scanner scans images developed on the photoreceptor to produce image signals representative thereof. A multiple speed drive is provided for the photoreceptor to move the photoreceptor at a high speed when processing copies xerographically and at a lower speed compatible with the data transmission rate for image signals when writing or reading images.

25 Claims, 4 Drawing Figures

FIG. 4

| | MODE I | MODE II | | | MODE III | | |
|---|---|---|---|---|---|---|---|
| | HIGH SPEED | LOW SPEED | HIGH SPEED | HIGH SPEED | HIGH SPEED | LOW SPEED | HIGH SPEED |
| DRUM DRIVE MOTOR (31) HIGH / LOW | | | | | | | |
| CHARGE POWER SUPPLY (37) | | | | | | | |
| EXPOSURE LAMP (15) | | | | | | | |
| DEVELOPER MOTOR (38) | | | | | | | |
| DEVELOPER CAM MOTOR (85) | | | | | | | |
| TRANSFER POWER SUPPLY (40) | | | | | | | |
| SHEET FEED MOTOR (39) | | | | | | | |
| CLEANING BRUSH MOTOR (41) | | | | | | | |
| CLEANING BRUSH CAM MOTOR (84) | | | | | | | |
| POLYGON DRIVE MOTOR (72) | | | | | | | |
| LASER (60) | | | | | | | |

MULTIPLE MODE IMAGE PROCESSING APPARATUS AND METHOD

The invention relates to a multi-mode reproduction apparatus and method, and more particularly to apparatus and method for accommodating discrepancies between xerographic processing rates and data transmission rates of communication networks without resorting to large scale buffering.

In a reproduction apparatus capable of processing copies both xerographically and electronically, a differential often exists between the rate at which copies may be processed xerographically and the rate at which image signals or data can be transmitted. Typically, in an apparatus of this type, a copying mode is provided to permit copying xerographically of document originals. In this operational mode, the xerographic processing is done at relatively high photoreceptor speeds.

In another mode, such as an electronic image writing mode, a flying spot type scanner may be employed to write the electrostatic latent images on the apparatus photoreceptor from image signals input thereto through a data transmission link. The source of the image signals may be a memory, or a data communication link such as used with facsimile equipment, etc. The electrostatic images produced by the scanner are thereafter processed xerographically to provide copies of the image represented by the image signals.

Alternately, the scanner may be used to read images developed on the photoreceptor and the image signals produced therefrom transmitted to a remote site through the data transmission link.

However, for operations of these latter types, the rate at which image signals can be transmitted over a data transmission link is usually much less than the rate at which copies can be processed xerographically, primarily due to the bandwidth limitations of present day communication and storage facilities. Additionally, transmission of image signals may be asynchronous rather than synchronous as where the communication system or network protocol is packet switched.

In an effort to accommodate this discrepancy between xerographic processing rates and data transmission rates, buffers may be used to buffer the image signals on a per page basis when writing or reading images electronically. When buffering of a page of image signals is completed, the raster scanner, when writing images for example, is actuated to image the photoreceptor in accordance with the buffered image signals. The resulting electrostatic image is processed xerographically, the scanning and xerographic processing taking place at the relatively high photoreceptor speed associated with xerographic processing.

While the above procedure may be feasible, the high cost of buffers having the capacity required is a major drawback.

This invention relates to a method of accommodating differences between the rate at which images are processed xerographically and the image signal transmission rate of a data transmission system, the image signals being transmitted in either synchronous or asynchronous fashion by the data transmission system, the steps which comprise: in a xerographic processing mode, moving a photoconductive member at a first speed while processing images xerographically; in a scan mode, reading the images on the photoconductor member as the images are being xerographically processed by scanning the photoconductive member to produce image signals representative of the images read; while reading the images, moving the photoconductive member uninterruptedly or in steps at a second speed compatible with the image signal transmission rate whereby the photoconductive member acts as a buffer to accommodate the difference between the image signal transmission rate and the xerographic processing rate; and following reading of the images, returning the photoconductive member to the first speed for further xerographic processing of the images read.

The invention further relates to a xerographic type reproduction apparatus comprising, in combination: a movable photoconductive member, means for producing images on the photoconductive member; image reading means for reading the images on the photoconductive member to provide image signals representative of the images read; data transmission means for the image signals, the data transmission means being adapted to transmit the image signals at a predetermined image signal transmission rate; and drive means for moving the photoconductive member either continuously or in steps at a speed compatible with the predetermined image signal transmission rate.

Other objects and advantages of the present invention will be apparent from the ensuing description and drawings in which:

FIG. 4 is a timing chart showing the operational timing sequence for the apparatus shown in FIG. 1 for various operational modes.

Figure 1:
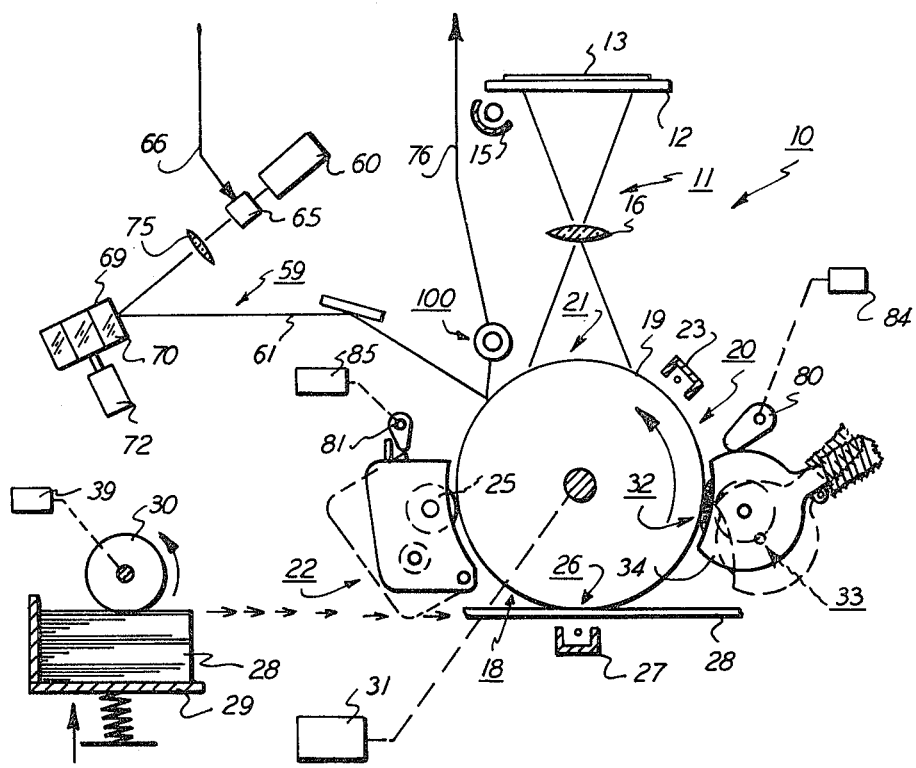
FIG. 1 is a schematic view showing an exemplary apparatus for carrying out multiple function image processing in accordance with the teachings of the present invention.

Referring particularly to FIG. 1 of the drawings, there is shown the multi-mode reproduction apparatus 10 of the present invention. As will appear, reproduction apparatus 10 is operable selectively in a COPY mode (MODE I) to xerographically make copies of original documents in the manner typical of xerographic copiers or machines, in a WRITE mode (MODE II) to xerographically produce copies from image signals input thereto using a flying spot type scanner, and in a READ mode (MODE III) to read images developed on the machine photosensitive member with the same flying spot scanner to produce image signals representative thereof and thereby convert the image to electronic signals.

Reproduction apparatus 10 includes a viewing station or platen 12 where document originals 13 to be copied or converted to image signals are placed. For operation particularly in the COPY mode, as will appear more fully herein, a light/lens imaging system 11 is provided, the light/lens system including one or more exposure lamps 15 for illuminating the original 13 on platen 12 and a lens 16 for transmitting image rays reflected from the original 13 to an exposure station 21. There, the image rays impinge upon a photoconductive surface 19 illustrated herein in the form of a photoreceptor drum 18.

Charging, developing, transfer and cleaning stations 20, 22, 26, 32 respectively are disposed about the periphery of drum 18 in operative relationship thereto. Charging station 20 includes a corona charging means 23 with power supply 37 therefor (see FIG. 3 also), charging means 23 depositing a uniform electrostatic charge on the photoconductive surface 19 when actuated. A suitable developing mechanism, which may for example, comprise a magnetic brush type developer roll 25, is provided at developing station 22 for developing the latent electrostatic images produced on drum 18. Developer roll 25 is driven by motor 38.

At transfer station 26, corona transfer means 27 effects transfer of the developed image to a suitable copy substrate material such as copy sheets 28. For this purpose, a supply of copy sheets 28 is provided in tray 29. A suitable sheet feeder, exemplified herein by sheet feed roll 30 and driven by motor 39 feeds one sheet at a time forward from tray 29 to transfer station 26. A suitable corona power supply 40 is provided for transfer corona means 27.

A suitable photoreceptor cleaning device such as cleaning brush 33 is provided at cleaning station 32 for cleaning drum 18 of leftover developer materials following transfer of the developed image to a copy sheet at transfer station 26. Brush 33 is disposed in an evacuated housing 34 through which the leftover developer materials removed by brush 33 are exhausted. A brush drive motor 41 is provided for rotating cleaning brush 33.

In the example shown, photoconductive surface 19 comprises a uniform layer of photoconductive material such as amorphous selenium on the surface of drum 18. Drum 18, which is supported for rotation in suitable journals (not shown), is driven by motor 31. Drum motor 31 is drivingly coupled to drum 18 by suitable drive means (not shown). Motor 31 rotates drum 18 in the direction shown by the solid line arrow when processing copies.

When operating in the copy mode (MODE I), the photoconductive surface 19 is charged to a uniform level by corona charging means 23. Platen 12 and the original document 13 thereon is irradiated by light source 15, the light reflected from document 13 being focused onto the photoconductive surface 19 of drum 18 by lens 16 at exposure station 21. Platen 12 and the document 13 thereon are at the same time moved in synchronism with rotation of drum 18. The light reflected from the original 13 selectively discharges the previously charged photoconductive surface in a pattern corresponding to the image that comprises the original document.

The latent electrostatic image created on the photoconductive surface 19 of drum 18 is developed by developer roll 25 at developing station 22 and transferred to a copy sheet 28 at transfer station 26 through the action of transfer corona means 27. Following transfer, the photoconductive surface is cleaned by cleaning brush 33 to remove leftover developer material. A suitable fuser or fixing device (not shown) fixes the image transferred to the copy sheet 28 to render the copy permanent.

While the photoreceptor is illustrated in the form of a drum 18 other photoreceptor types such as belt, web, etc. may be envisioned. Additionally, the photoreceptor may be opaque, that is impervious to light, or wholly or partially transparent. While the exemplary drum 18 typically has an aluminum substrate which renders the drum opaque, other substrate materials such as glass may be contemplated, which would render drum 18 wholly or partially transparent. Organic photoconductive materials may also be contemplated, as for example an aluminized Mylar substrate having a layer of selenium dispersed in poly N-vinyl carbazole with a transparent polymer overcoating containing a charge transport compound such as pyrene. And while a scan type image system is illustrated, other types of imaging systems such as full frame flash, may be contemplated.

Reproduction apparatus includes a suitable raster scanner 59 illustrated herein as a flying spot scanner. Scanner 59 has a suitable flux source such as laser 60. The collimated beam 61 of monochromatic radiation generated by laser 60 is passed to a modulator 65 which for operation in a second image write mode, modifies the beam 61 in accordance with information contained in image signals input thereto along data transmission line 66 as will appear. Modulator 65 may comprise any suitable electro-optical or acousto-optical modulator or waveguide for imparting the informational content of the image signals input thereto to beam 61. For example, modulator 65 may be a Pockel's cell having a potassium dihydrogen phosphate crystal whose index of refraction is periodically varied by the application of the image input signal thereto.

The beam 61 output by modulator 65 passes to an imaging lens 75. Lens 75 focuses a light from laser 60 to a selected spot in the focal plane proximate the surface 19 of photoconductor drum 18, as will appear.

The beam 61 from lens 75 is reflected from the mirrored surfaces 70 of a rotating scanning polygon 69 onto the photoconductive surface 19 at a point upstream of developing station 22. Polygon 69 is driven by motor 72. As will be understood by those skilled in the art, rotation of polygon 69 repeatedly scans the light spot across the surface of drum 18 to form what is known as a flying spot scanner. Light reflected from the photoconductive surface 19 of drum 18 is collected in an integrating cavity 100 and there converted to image signals when operating in a third READ mode (MODE III), as will appear.

Figure 2:
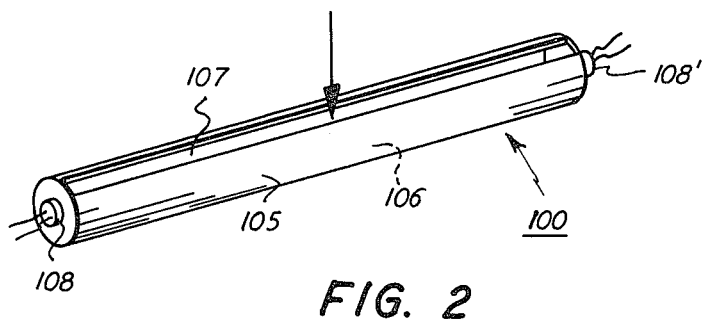
FIG. 2 is an isometric view showing details of the integrating cavity used with the apparatus shown in FIG. 1.

Referring particularly to FIG. 2, integrating cavity 100 consists of an elongated hollow cylindrical housing 105 disposed adjacent to and in predetermined spaced relationship to the surface 19 of drum 18, housing 105 being supported such that the longitudinal axis of housing 105 substantially parallels the axis of drum 18. Housing 105 is provided with an elongated slit-like aperture 107 in the wall thereof opposite photoconductive surface 19, housing 105 being located such that light reflected from the photoconductive surface of drum 18 passes through aperture 107 into the interior 106 of housing 105. A pair of photodetectors 108,108' are provided in housing 105 at the ends thereof, photodetectors 108,108' generating analog signals in response to the presence or absence of light. To enhance the light responsiveness of housing 105, the interior wall 106 thereof is preferably finished with a highly reflective material such as highly reflective lambertian coating.

It will be understood that where the photoreceptor is transparent, integrating cavity 100 is suitably supported within the interior of drum 18 to receive light transmitted through the photoconductive material.

When operating in the copy mode (MODE I), latent electrostatic images are formed on the photoconductive surface 19 through exposure of the document 13 on platen 12 as described heretofore. In the WRITE mode, (MODE II) scanner 59 is actuated to write latent electrostatic images on the photoconductive surface 19 by scanning the surface with beam 61 modulated in accordance with the image signals input thereto through data transmission line 66. In this mode, modulator 65 modulates the light intensity of the scanning beam 61 in accordance with the content of the image signals input thereto so that scanning beam 61 dissipates the electrostatic charge on the drum surface to create a latent electrostatic image representative of the image signals input thereto. The electrostatic image created is thereafter developed by developer roll 25 and transferred to a copy sheet 28 at transfer station 26. Following transfer, the photoconductive surface is cleaned by cleaning brush 33 as described heretofore.

In this mode of operation and in the READ mode (MODE III) described below, polygon 69 may be continually driven at a substantially constant speed by motor 72.

In the READ mode, (MODE III) where it is desired to read original 13 and convert the content thereof to image signals, the photoconductor drum 18 is cycled twice for each read operation. During the first cycle, a latent electrostatic image is created on the drum photoconductive surface 19, normally through exposure of the original 13 on platen 12 as described heretofore. The latent electrostatic image is thereafter developed by developer roll 25. The developed image is carried by drum 18 past transfer station 26, cleaning station 32, charging station 20 and exposure station 21. On the second cycle of drum 18, as the developed image comes opposite the point where beam 61 scans the photoreceptive surface 19, the developed image is scanned line by line. The light from beam 62 is reflected from the surface of the photoconductive surface 19 in accordance with the presence or absence of toner to integrating housing 105, it being understood that where the light beam strikes toner, the light is absorbed and hence not reflected whereas the light beam strikes the uncovered portions of the photoconductive surface, the light is reflected back by the photoconductive surface. The presence or absence of light in housing 105 is sensed by photodetectors 108,108' to provide analog signals representative of the developed image scanned to data transmission line 76.

To permit the developed image to pass transfer station 22 and cleaning station 32 unimpeded, tranfer corona means 27 is inactivated and suitable means such as camming element 80 is provided to separate cleaning brush 33 and housing 34 thereof from the photoconductive surface 19. Camming element 80, which is driven by one-half revolution step motor 84 is activated in timed synchronism with rotation of the drum 18 as will appear. It will be understood that corona generating means 23 and light/lens imaging system 11 are inactivated while the developed image moves therepast.

A camming element 81, which may be driven by one-half revolution step motor 85, is similarly provided to move developing roll 25 out of contact with the surface of drum 18 during the second drum cycle to permit the previously developed image to pass thereby following reading thereof by scanning beam 61. The developed image may thereafter be transferred to copy sheet 28 following which the drum surface is cleaned by cleaning brush 33 as described heretofore. For this purpose, camming element 80 is reset to return cleaning brush 33 to operative contact with the photoconductive surface 19, and corona transfer means 27 activated to transfer the developed image to a copy sheet 28.

As will be understood by those skilled in the art, the rate at which image signals may be input to modulator 65 through data transmission line 66 when operating in the WRITE mode is limited by the slowest component in the system. In a communication or facsimile type system, for example, the maximum rate of data transmission is normally limited by the bandwidth of the data communication channel or network being used which is often less than the rate at which images are processed xerographically by the reproduction apparatus 10. Similarly, the rate at which image signals may be output to data transmission line 76 when operating in the READ mode is limited by the transmission rate of the data communication channel or network. Further, the communication network protocol may be packet switched with the result that image signals may be received or transmitted asynchronously.

To accommodate the difference between the rate at which images are processed xerographically and the rate at which image signals are transmitted or received while avoiding the need for large relatively expensive electronic buffers, the photoconductor drum 18 itself is utilized as a buffer to store the image data when operating the multi-mode reproduction apparatus 10 in either the image WRITE (MODE II) or image READ (MODE III) modes. To effectuate this, the operating speed of photoreceptor drum 18 is changed when operating scanner 59 to synchronize drum speed with the data transmission rate of data transmission lins 66,76. Since drum 18 is operated during transmission of image signals, it will be understood that in the case of packet switching, drum 18 is operated in stepped fashion wherever image signals are transmitted or received by the communication network.

In the embodiment shown in FIG. 1, photoconductor drum drive motor 31 comprises a two-speed motor having a first or high speed for processing copies xerographically and a second or low speed when drum 18 is being scanned by scanner 59. It is understood that the high speed is chosen to provide an optimum xerographic processing speed while the motor low speed is chosen to accommodate the data transmission rate of the associated communication network.

Figure 3:
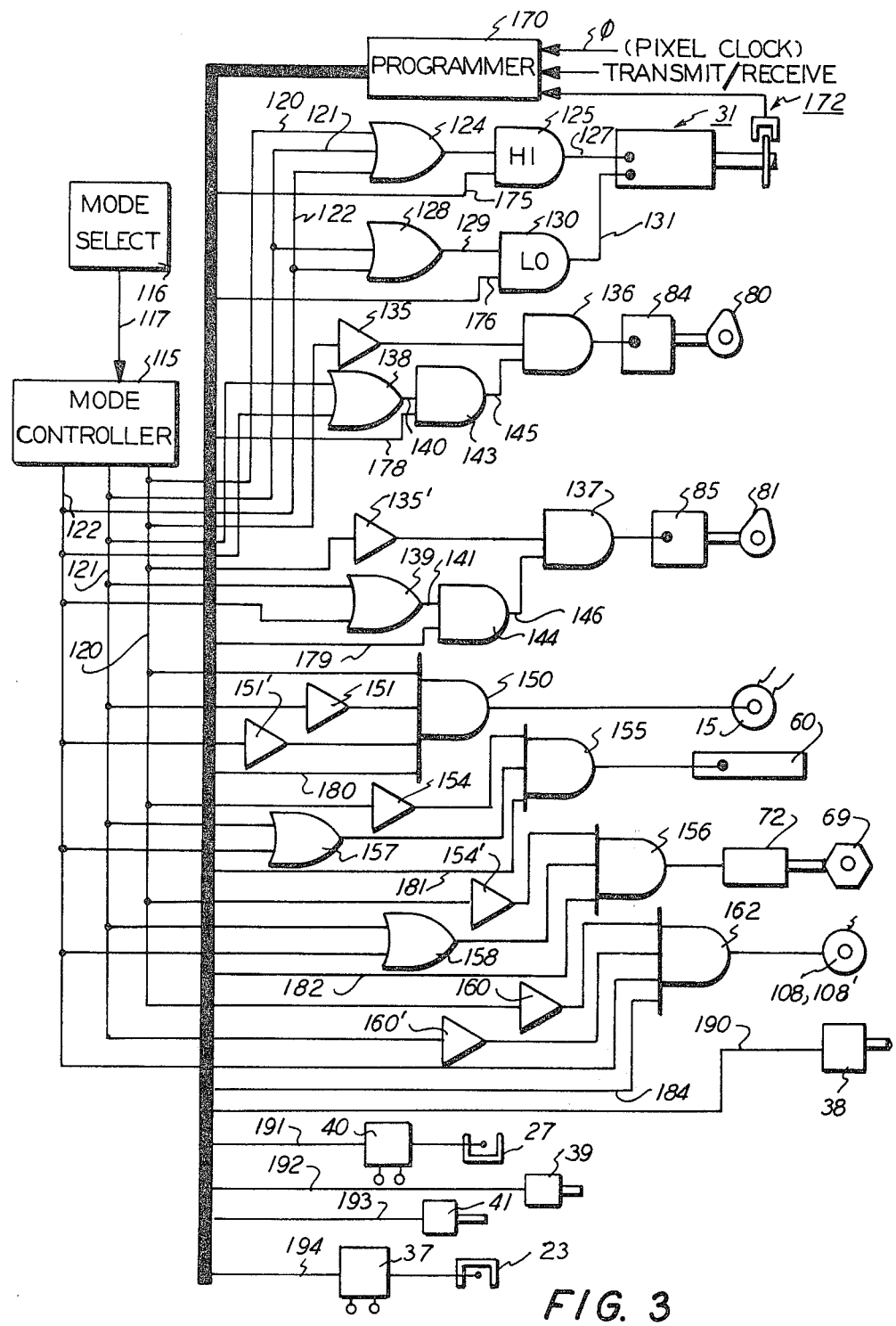
FIG. 3 is a logic schematic of the control system for the apparatus shown in FIG. 1.

Referring now to FIGS. 3 and 4 particularly, a mode controller 115 is there provided for regulating enablement of the various machine operating components as will appear in accordance with the operational mode selected. A mode selector 116, which may be conveniently located on the machine operator console (not shown), permits the user or operator to select the operational mode desired, that is, COPY (MODE I), WRITE (MODE II) or READ (MODE III). The output of mode selector 116 is input via lead 117 to mode controller 115.

Output leads 120 (MODE I), 121 (MODE II) and 122 (MODE III) from controller 115 are input via OR gate 124 to high speed control gate 125. Lead 127 couples gate 125 to the control section of drum drive motor 31, triggering of gate 125 causing motor 31 to operate at high speed. MODE II, III leads 121, 122 are coupled to OR gate 128. The output of gate 128 is coupled by lead 129 to low speed control gate 130, the output of gate 130 being coupled to the control section of motor 31 by lead 131 such that triggering of gate 130 causes motor 31 to operate at low speed.

MODE I lead 120 is input via inverters 135, 135' to step motor control gates 136,137 controlling step motors 84,85. MODE II and III leads 121,122 respectively are input via OR gates 138,139 and leads 140,141 to AND gates 143,144. Leads 145,146 couple the output of gates 143,144 to step motor control gates 136,137.

MODE I lead 120 is input to exposure lamp control gate 150, gate 150 controlling energization of exposure lamp 15. MODES II and III leads 121,122 respectively are input via inverters 151,151' to gate 150. MODE I lead 120 is input via inverters 154,154' to laser control gate 155 and polygon drive motor control gate 156. Gates 155 and 156 control energization of laser 60 and drive motor 72 for polygon 69. MODE II and III leads are input to gates 155,156 via OR gates 157,158.

MODE I and II leads 120,121 are input via inverters 160,160' to detector control gate 162. MODE III lead 122 is input to gate 162. Gate 162 controls energization of light detectors 108,108' of integrating cavity 100.

Timed activation of the various components of multi-mode reproduction machine 10 is provided by a machine programmer 170 in response to timing signals generated by a suitable encoder 172. Encoder 172 is conveniently disposed on the output shaft of drum drive motor 31, encoder 172 responding to rotation of motor 31 and movement of photoreceptor drum 18 to generate a succession of timing signals for timing operation of the various machine components in accordance with preset operational programs for each operating mode stored in programmer 170. As will be understood by those skilled in the art, the aforementioned operational programs may be in the form of software, or alternately, programmer 170 may be hardwired for this purpose.

Motor control output leads 175,176 from programmer 170 are coupled to high and low speed motor control gates 125,130 respectively. Developer and cleaning separation control leads 178,179 from programmer 170 are coupled to step motor control gates 143,144 respectively. And exposure lamp control lead 180, laser control lead 181, and polygon drive motor control lead 182 from programmer 170 are coupled to lamp control gate 150, laser control gate 155, and polygon motor control gate 156 respectively. Detector control lead 184 from programmer 170 is coupled to detector control gate 162.

Control leads 190, 191, 192, 193, and 194 from programmer 170 control actuation of developer roll drive motor 38, corona transfer means power supply 40, sheet feed roll drive motor 39, cleaning brush drive motor 41 and corona charge means power supply 37.

For operation in the COPY mode, the MODE I signal from controller 115 enables exposure lamp 15 and sets photoreceptor drum drive motor 31 for high speed operation. Polygon drive motor 72 and laser 60 of scanner 59 are disabled as are step motor 84, 85 for developing and cleaning station separation cams 80,81. Developing station 22 and cleaning station 32 accordingly remain in operative contact with the photoconductive surface 19 of drum 18.

As described, latent electrostatic images are created through exposure of the charged photoconductive surface 19 to a light image of the original 13 on platen 12, the image being developed by developer roll 25 at developing station 22 and transferred to a copy sheet 28 fed forward in timed sequence by sheet feed roll 30 at transfer station 26. Following transfer, leftover developer materials are removed from the photoconductor drum surface by brush 33 at cleaning station 32. Control signals from programmer 170 actuate photoconductor drum drive motor 31, exposure lamp 15, developer roll drive motor 38, sheet feed motor 39, cleaning brush drive motor 41, power supply 37 for corona charge means 23, and power supply 40 for corona transfer means 27 in predetermined timed order as required to produce the copy or copies desired.

For operation in the WRITE mode, the MODE II signal from controller 115 enables polygon drive motor 72 and laser 60 of scanner 59 to permit scanning of the photoconductive surface 19 by scanning beam 61 and writing of images thereon in accordance with image signals input to modulator 65 through data transmission line 66.

Additionally, the MODE II signals from controller 115 set photoreceptor drum drive motor 31 for low speed operation and ready step motors 84,85 of developing and cleaning station separation cams 80,81 respectively for operation under the control of control signals output by programmer 170.

Latent electrostatic images are written on the photoconductive surface of drum 18 by scanner 59 in accordance with the image signal input to modulator 65 from data transmission line 66, control signals from programmer 170 operating photoconductor drum drive motor 31 at low speed in response to the transmission of image signals. As described herein, the rotational speed imparted to drum 18 at the motor low speed setting is preferably chosen to be compatible with the rate $\phi$ (Pixel Clock), at which image signals are transmitted in data transmission line 66.

During this period, step motors 84,85 are operated to separate cleaning brush 33 and developer roll 25 from drum 18 to permit the latent image to pass developing and cleaning stations 22, 32 unimpeded.

Following completion of the image page, scanner 59 is inactivated while photorecetor drum drive motor 31 is switched to high speed. Motor 85 resets cam 81 to return developer roll 25 into operative contact with the drum surface before the leading edge of the latent image reaches developing station 22 to enable the latent image to be developed. The developed image is thereafter transferred to a copy sheet 28 at transfer station 26. With passage of the latent image past cleaning station 32, motor 84 resets cam 80 to return cleaning brush 33 into operative contact with the surface of drum 18 to enable cleaning of leftover developing materials from drum 18 following transfer of the developed image to copy sheet 28.

For operation in the READ mode, and presuming that original 13 on platen 12 comprises the image to be read by scanner 59, the MODE III signal from controller 115 sets photoreceptor drum driving motor 31 for high speed operation and enables exposure lamp 15 and step motor 84, the latter to separate cleaning brush 33 from drum 18 through cam 80. During copying, control signals from programmer 170 actuate drum driving motor 31 (at high speed), power supply 37 of corona charging means 23, exposure lamp 15, and drive motor 38 of developer roll 25 to create a developed image of the original on the photo-conductive surface of drum 18.

To permit the developed image to pass unimpeded past cleaning station 32, a control signal from programmer 170 actuates step motor 84 to separate cleaning brush 33 from drum 18. Corona transfer means 27, sheet feed motor 31, and exposure lamp 15 are held inactive as the developed image passes the operating station associated therewith.

As the leading edge of the developed image approaches the point where the scanning light beam 61 impinges on photoconductive drum 18, drum drive motor 31 is set for low speed operation and laser 60 is enabled. At the same time, polygon drive motor 72, photodetectors 108,108' and step motor 85 may be actuated, the latter to separate developer roll 25 from drum 18.

On a receive Signal, scanner 59 scans the developed image line by line. Control signals from programmer 170 operate laser 60 and drive motor 31, the latter to move drum 18 at low speed while the developed image thereon is scanned. Light reflected from the photoconductive surface of drum 18 is sensed by photodetectors 108,108' to produce image signals representative of the developed image on drum 18. The image signals produced are accordingly output via line 76 to a suitable user or storage device (not shown) at a rate commensurate with the data transmission rate limitations of data transmission line 76.

Following reading of the developed image, scanner 59 is inactivated and drum drive motor 31 is set for high speed operation. Step motor 84 is inactivated to permit cam 80 to return cleaning brush 33 into engagement with the surface 19 of drum 18. As the developed image moves through transfer station 26, corona transfer means 27 is actuated to transfer the developed image to a copy sheet 28 fed forward by feed roll 30. Following transfer, the surface of drum 18 is cleaned by brush 33 at cleaning station 32.

While scanning beam 61 of scanner 59 is illustrated as impinging on drum 18 at a point upstream of developing station 22, it will be understood that beam 61 may be arranged, as by means of suitable reflecting surfaces, to impinge upon the photoconductive surface of drum 18 at a point downstream of developing station 22 and before transfer station 26 when operating reproduction machine 10 in the READ mode (MODE III) as for example in the manner described in co-pending application Ser. No. 111,520 filed on Apr. 17, 1981 in the names of Charles J. Kramer, David B. Kay and Christopher Snelling. In that type of arrangement, drum 18 need cycle only once when operating in the READ mode.

While photoreceptor drum drive motor 31 is illustrated herein as comprising a two-speed motor which may be operated in stepped fashion during scanning to permit asynchronous transmission or reception of image signals, other motor types such as a variable speed motor, or stepping motor, etc., may be contemplated. In the case of a variable speed motor, suitable control means for setting the motor to a speed compatible with the existing data transmission rate is employed.

Where drive motor 31 comprises a stepping motor, the motor is stepped for each line of image data written during WRITE mode (MODE II) or read during READ mode (MODE III). In this circumstance, image signals are preferably processed at the same rate as copies are processed xerographically with drum 18 moved at the relatively high xerographic processing speed. Since this results in a scanning rate at which the image signals are written (MODE II) or read (MODE III) at a rate higher than the rate at which the image signals are transmitted, a small one or two line buffer may be utilized to buffer the image signals until a line thereof has been accumulated when operating in the WRITE mode or to buffer the line of image signals read pending transmission thereof when operating in the READ mode.

While the image signal transmission/reception rate has been described herein as being less than the xerographic processing rate, the invention is not intended to be so limited, but to instead, include systems where the xerographic processing rate is equal to or less than the image signal transmission/reception rate as well. And it will be understood that where image signal reception and transmission rates are not the same, different effective photoreceptor speeds are provided to match photoreceptor operating speed in Modes II and III with the rate at which image signals are being received or transmitted as described herein.

While the invention has been described with reference to the structure disclosed, it is not confined to the details set forth, but is intended to cover such modifications or changes as may come within the scope of the following claims:

What is claimed is:

1. A method of accommodating differences between the rate at which images are processed xerographically and the image signal transmission rate of a data transmission system, said image signals being transmitted in either synchronous or asynchronous fashion by said data transmission system, the steps comprising:
   in a xerographic processing mode, moving a photoconductive member at a first speed while processing images xerographically;
   in a scan mode, reading said images on said photoconductive member as said images are being xerographically processed by scanning said photoconductive member to produce image signals representative of the images read;
   while reading said images, moving said photoconductive member uninterruptedly or in steps at a second speed compatible with said image signal transmission rate whereby said photoconductive member acts as a buffer to accommodate the difference between said image signal transmission rate and said xerographic processing rate; and
   following reading of said images, returning said photoconductive member to said first speed for further xerographic processing of the images read.

2. The method according to claim 1 including the step of:
   providing said images through exposure of said photoconductive member to document originals while moving said photoconductive member at said first speed.

3. The method according to claim 1 including the step of:
   providing said images by scanning said photoconductive member and exposing said photoconductive member in accordance with image signals input at said data transmission rate while moving said photoconductive member uninterruptedly or in steps at said second speed.

4. The method according to claim 1 including the steps of:
   developing said images in said xerographic processing mode; and
   reading said developed images in said scan mode.

5. The method according to claim 1 including the step of asynchronously stepping said photoconductive member in response to transmission of said image signals whereby to provide said second photoconductive member speed.

6. A method of accommodating differences between the rate at which images are processed xerographically and the image signal transmission rate of a data transmission system, said image signals being transmitted in either synchronous or asynchronous fashion by said data transmission system, the steps comprising:

moving a photoconductive member at a first speed while processing an image xerographically;

writing latent electrostatic images on said photoconductive member for processing xerographically in accordance with image signals input at said image signal transmission rate;

while writing said images, moving said photoconductive member uninterruptedly or in steps at a second speed compatible with said image signal transmission rate whereby said photoconductive member acts as a buffer to accommodate the difference between said image signal transmission rate and said xerographic processing rate; and following writing of said images, returning said photoconductive member to said first speed for xerographic processing of the images written.

7. The method according to claim 6 including the steps of:

developing images written on said photoconductive member; and transferring said developed images to copy substrate material.

8. The method according to claim 7 including the step of:

scanning said images after developing but before transfer to said copy substrate material to produce image signals representative of the developed images scanned; and moving said photoconductive member uninterruptedly or in steps at said second speed while scanning said developed images.

9. The method according to claim 6 including the steps of:

producing said images in an alternate manner through exposure of said photoconductive member to document originals while moving said photoconductive member at said first speed;

xerographically processing said images to develop said images on said photoconductive member and transfer said images after development from said photoconductive member to copy substrate material to provide copies of said images.

10. A multi-mode image processing method, the steps which comprise:

moving a photoconductive member at a first speed when processing copies xerographically;

moving said photoconductive member at a second speed compatible with the signal transmission rate of a data input line when scanning said photoconductive member to write images on said photoconductive member in response to said signals; and moving said photoconductive member at a third speed compatible with the signal transmission rate of a data output line when scanning said photoconductive member to read images developed on said photoconductive member to produce signals representative of the images read.

11. The method according to claim 10 including the step of disabling the xerographic processing components when moving said photoconductive member at said second and third speeds.

12. In a xerographic type reproduction apparatus having a movable photoconductive member, the combination of:

means for producing images on said photoconductive member;

image reading means for reading said images to provide image signals representative of the images read;

data transmission means for said image signals, said data transmission means being adapted to transmit said image signals at a predetermined image signal transmission rate; and drive means for moving said photoconductive member either continuously or in steps at a speed compatible with said predetermined image signal transmission rate.

13. The apparatus according to claim 12 including:

means for xerographically processing said images to provide copies of said images;

said drive means moving said photoconductive member at a second speed compatible with said xerographic process when processing said copies xerographically.

14. The apparatus according to claim 13 in which said processing means includes:

developing means for developing said images on said photoconductive member; and transfer means for transferring said developed images to copy substrate material;

said image reading means reading said images after developing by said developing means but before transfer by said transfer means.

15. The apparatus according to claim 13 in which said image producing means includes:

a platen for supporting documents to be reproduced;

charging means for charging said photoconductive member in preparation for imaging; and exposure means for exposing said photoconductive member to documents on said platen to produce images on said photoconductive member, said drive means moving said photoconductive member at said second speed when exposing said photoconductive member.

16. The apparatus according to claim 12 in which said image producing means includes:

charging means for charging said photoconductive member in preparation for imaging;

scanning means for scanning said photoconductive member to expose said photoconductive member, said scanning means including image write means for writing images on said photoconductive member in response to image signals input by said data transmission means, said drive means moving said photoconductive member at said first mentioned speed when scanning said photoconductive member.

17. The apparatus according to claim 13 in which said drive means comprises a step motor, and control means for intermittently stepping said motor to move said photoconductive member at said first mentioned speed.

18. The apparatus according to claim 13 in which said drive means comprises a variable speed motor, and control means for regulating said motor to move said photoconductive member at said first mentioned and said second speeds selectively.

19. In a xerographic apparatus for reproducing images having a movable photoconductive member, the combination of:

image producing means for producing images on said photoconductive member;

image writing means for writing images on said photoconductive member in accordance with image signals input thereto;

data transmission means for said image signals, said data transmission means being adapted to transmit said image signals at a rate different than the rate at which said image producing means produces said images;

drive means for moving said photoconductive member; and control means for controlling said drive means to move said photoconductive member at a first effective speed on operation of said image producing means and at a second effective speed on operation of said image writing means.

20. The xerographic apparatus according to claim 19 in which said drive means comprises a step motor, said control means intermittently stepping said motor to move said photoconductive member at said second effective speed.

21. The xerographic apparatus according to claim 19 in which said drive means comprises a multiple speed motor, said control means controlling said motor to move said photoconductive member at said first effective speed during operation of said image producing means and to move said photoconductive member at said second effective speed during operation of said image writing means.

22. The apparatus according to claim 19 developing means for developing images produced on said photoconductive member; and image reading means for reading said developed images to produce image signals representative of the developed images read for transmittal by said data transmission means at said data transmission rate, said control means controlling said drive means to move said photoconductive member at said second effective speed on operation of said image reading means.

23. In a multi-mode reproduction apparatus, the combination of:

means for xerographically reproducing copies including a movable photoconductive member, means to charge said member, means to expose originals to be copied to create a latent electrostatic image of said originals on said charged member, means to develop said image, means to transfer the developed image to copy substrate material, and cleaning means for cleaning said photoconductive member;

scanning means for raster scanning said photoconductive member and images developed on said photoconductive member to produce image signals representative of the developed image scanned, said scanning means including a high intensity light beam, means to focus said beam on said member, means astride the path of said beam for scanning said beam across said member, and image reading means for converting light pulses produced from scanning said photoconductive member and the image developed on said member with said light beam image signals;

data transmission means for transmitting the image signals produced;

drive means for moving said member; and control means for controlling said drive means to move said member at a first speed when said xerographic reproduction means is actuated and at a second speed when said scanning means is actuated, said first speed being chosen to match the rate at which copies are processed xerographically, said second speed being chosen to match the rate at which said image signals are produced by said scanning means with the signal transmission rate of said data transmission means.

24. The reproduction apparatus according to claim 23 in which said scanning means includes image writing means for modulating said light beam in accordance with image signals input from said data transmission means to produce latent electrostatic images on said photoconductive member.

25. The reproduction apparatus according to claim 23 in which said data transmission means includes a data output line having a transmission rate lower than the rate at which copies are processed xerographically;

said drive means comprising a step motor operable at said first effective speed;

said scanning means including buffer means for holding a present block of said image signals;

said control means stepping said motor to increment said photoconductive member in steps while said photoconductive member is scanned by said scanning means whereby to provide said second speed, image signals produced by said scanning means being input to said buffer means pending output of said image signals to said data transmission line at said lower transmission rate.

* * * * *